(12) United States Patent
Takagi et al.

(10) Patent No.: US 6,191,915 B1
(45) Date of Patent: Feb. 20, 2001

(54) SUSPENSION FOR DISC DRIVE THAT IS CAPABLE OF RESTRAINING EXCESSIVE INCLINATION OF A HEAD OR OCCURRENCE OF DIMPLE SEPARATION WHEN IT IS SHOCKED, WITHOUT ENHANCING THE STIFFNESS OF A FLEXURE

(75) Inventors: Yasuji Takagi, Ebina; Akinobu Ishizaka, Yamato; Osamu Ohkawara; Hideki Kashima, both of Aikawamachi; Osamu Iriuchijima, Yokohama, all of (JP)

(73) Assignee: NHK Spring Co., Ltd., Yokohama (JP)

( * ) Notice: Under 35 U.S.C. 154(b), the term of this patent shall be extended for 0 days.

(21) Appl. No.: 09/186,265

(22) Filed: Nov. 4, 1998

(30) Foreign Application Priority Data

Nov. 6, 1997 (JP) .................................... 9-304454

(51) Int. Cl.$^7$ ........................................ G11B 5/48
(52) U.S. Cl. ............................................. 360/104
(58) Field of Search ............................ 360/104, 245.7

(56) References Cited

U.S. PATENT DOCUMENTS

| | | | | |
|---|---|---|---|---|
| 5,333,085 | * | 7/1994 | Prentice et al. | 360/104 |
| 5,570,249 | * | 10/1996 | Aoyagi et al. | 360/104 |
| 5,570,261 | * | 10/1996 | Frater et al. | 360/104 |
| 5,682,279 | * | 10/1997 | Imasaki | 360/104 |
| 5,771,136 | * | 6/1998 | Girard | 360/104 |
| 5,838,517 | * | 11/1998 | Frater et al. | 360/104 |
| 5,877,920 | * | 3/1999 | Resh | 360/104 |
| 5,930,073 | * | 7/1999 | Vera et al. | 360/104 |
| 5,959,807 | * | 9/1999 | Jurgenson | 260/104 |
| 5,969,906 | * | 10/1999 | Arya et al. | 360/104 |
| 5,973,882 | * | 10/1999 | Tangren | 360/104 |
| 5,987,733 | * | 11/1999 | Goss | 360/104 |
| 6,046,883 | * | 4/2000 | Miller | 360/104 |
| 6,088,201 | * | 7/2000 | Kazama | 360/244.2 |

FOREIGN PATENT DOCUMENTS 5-282642  10/1993  (JP) .

* cited by examiner

*Primary Examiner*—Brian E. Miller
(74) *Attorney, Agent, or Firm*—Frishauf, Holtz, Goodman, Langer & Chick, P.C.

(57) ABSTRACT

A suspension for a disc drive includes a load beam, a flexure that is attached to the load beam and that has a tongue portion as a moving part, and a limiter member that is attached to the flexure and that is used to restrain the angle of inclination of the tongue portion. The flexure includes a pair of outrigger portions, left and right, and the tongue portion is situated between the outrigger portions. The tongue portion carries a head thereon. The limiter member includes arms, detachedly facing the outrigger portions of the flexure in the thickness direction thereof in order to control the angle inclination of the tongue portion, and a front edge portion detachedly facing the rear end portion of the tongue portion in the thickness direction thereof.

2 Claims, 7 Drawing Sheets

SUSPENSION FOR DISC DRIVE THAT IS CAPABLE OF RESTRAINING EXCESSIVE INCLINATION OF A HEAD OR OCCURRENCE OF DIMPLE SEPARATION WHEN IT IS SHOCKED, WITHOUT ENHANCING THE STIFFNESS OF A FLEXURE

BACKGROUND OF THE INVENTION

The present invention relates to a suspension for supporting a head of a disc drive stored in an information processing apparatus such as a personal computer, portable computer, etc.

Figure 11:
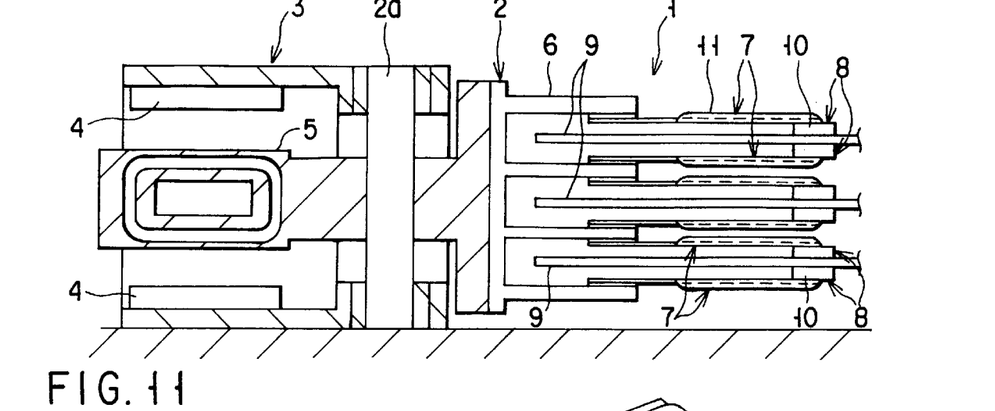
FIG. 11 is a side view, partially in section, showing a hard disc drive.

FIG. 11 shows a part of a hard disc drive (HDD) 1. A carriage 2 of the disc drive 1 is turned around a shaft 2a by means of a motor 3 for positioning, such as a voice coil motor. The carriage 2 is composed of a coil portion 5 located near a magnet 4 of the motor 3, arms (also referred to as actuator arms) 6 fixed to the coil portion 5, suspensions 7 situated on the distal end side of the arms 6, heads 8 attached individually to the respective distal end portions of the suspensions 7, etc. Each head 8 can be moved to a desired track (recording surface) of a hard disc 9 by driving the carriage 2 by means of the motor 3.

Each head 8 includes a slider 10, which is situated in a position such that it can face the tracks of the disc 9, a transducer (not shown) which is provided on the slider 10, etc. When the slider 10 barely floats above the surface of the disc 9 as the disc 9 rotates at high speed, an air bearing is formed between the disc 9 and the slider 10.

Figure 12:
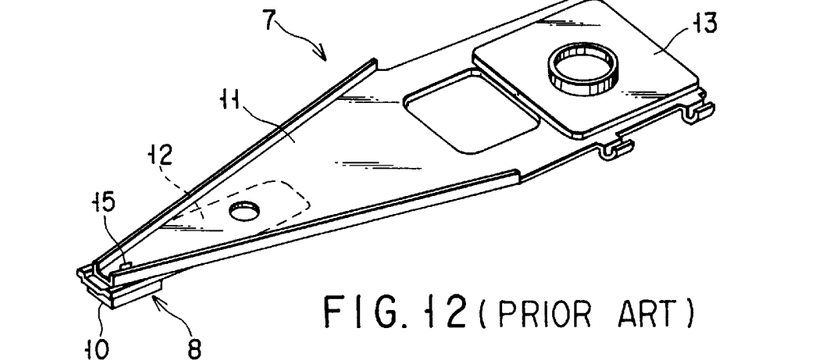
FIG. 12 is a perspective view showing a conventional suspension.
Figure 13:
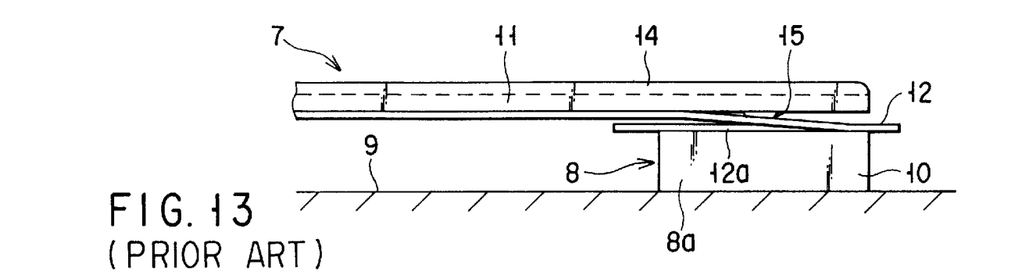
FIG. 13 is a side view schematically showing the suspension of FIG. 12.
Figure 14:
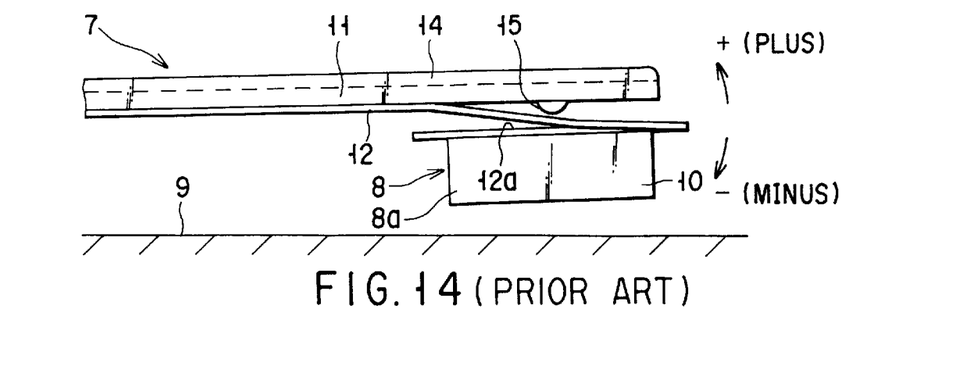
FIG. 14 is a side view schematically showing the suspension of FIG. 12 in a shocked state.

FIGS. 12, 13 and 14 show an example of the conventional suspension 7. The suspension 7 comprises a load beam 11 formed of a thin precision plate spring, a flexure 12 formed of a very thin plate spring fixed to the distal end portion of the load beam 11, a base plate 13 fixed to the proximal portion of the beam 11. The slider 10 is mounted on a tongue 12a that is formed on the flexure 12. The stiffness of the flexure 12 is made so low that the attitude of the slider 10 floating low above the disc 9 can be flexibly changed.

A hemispherical support projection 15 protrudes from the distal end portion of the load beam 11 toward the flexure 12. As shown in FIG. 13, the distal end of the support projection 15 is in contact with the tongue 12a of the flexure 12. Therefore, the head 8 can make three-dimensional displacements, including pitching, rolling, etc., around the support projection 15. The projection 15, which is depressed inside, is also called a dimple in the art. The projection 15 may be provided on the flexure 12 instead of being formed on the load beam 11.

With the progress of miniaturization of modern information processing apparatuses such as personal computers, the shock resistance properties of hard disc drives (HDDs) have become an important factor. In the case of an information processing apparatus that uses a small-sized hard disc (2.5-inch HDD), such as a so-called notebook computer, the shock-absorbing capability of its casing is not good enough. In the case of a desktop computer (using a 3.5-inch HDD), on the other hand, the HDD may possibly be subjected to a relatively heavy shock if it is handled wrongly in assembling operation.

When the aforementioned conventional suspension 7 was subjected to a shock exceeding its tolerance limit, the head 8 behaved unsteadily, and the head 8 and the disc 9 were damaged. The inventors hereof observed the behavior of the shocked head 8 by using a high-speed camera and the like, and found that the head 8 and the disc 9 were damaged in the following manner. When the suspension 7 was shocked, the distal end portion of the load beam 11 sprang up, as shown in FIG. 14. Thereupon, the head 8 underwent pitching or rolling so that its corner portions (including a corner portion 8a) ran against the surface of the disc 9. A phenomenon called dimple separation such that the flexure 12 and the support projection 15 separate from each other, in particular, promotes the aforesaid problem.

Figure 15:
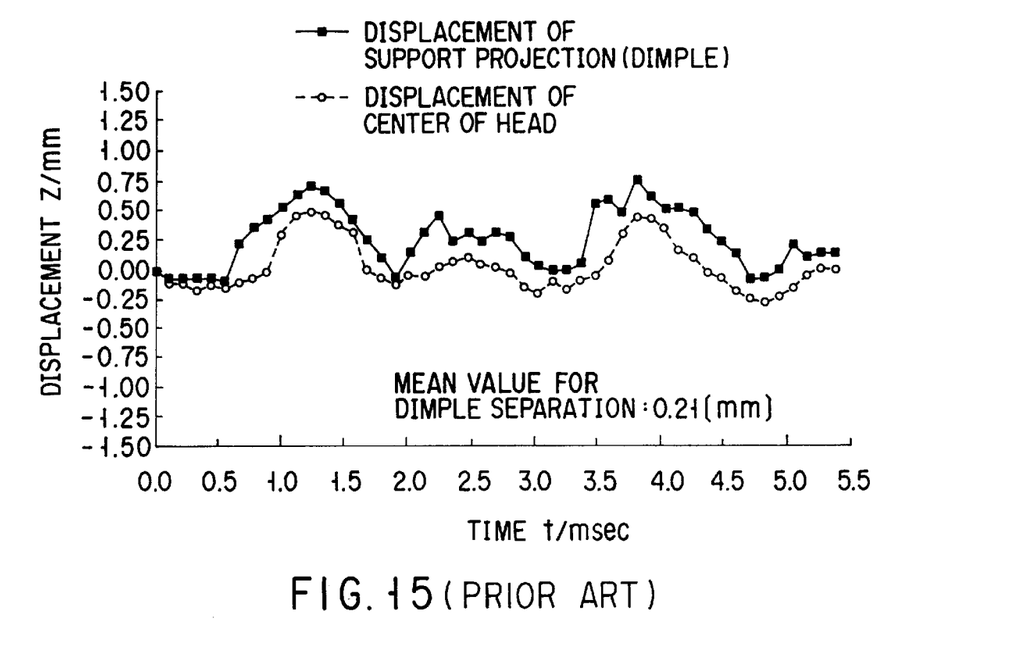
FIG. 15 is a diagram showing displacements of a head and the like in a shock test on the suspension of FIG. 12.
Figure 16:
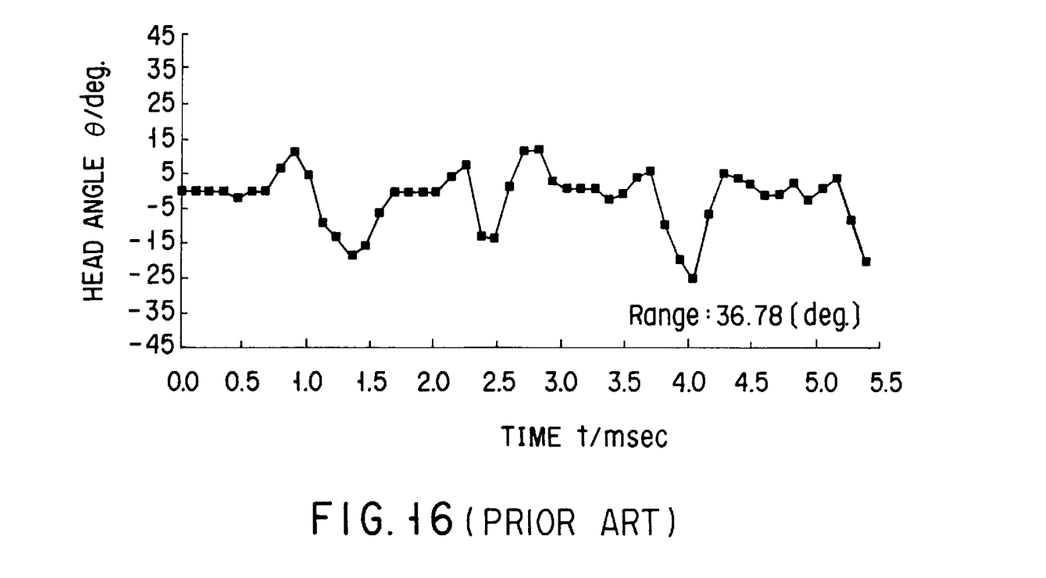
FIG. 16 is a diagram showing the change of the angle of inclination of the head in the shock test on the suspension of FIG. 12.

FIG. 15 shows the result of measurement of the respective displacements of the head and the support projection obtained when the conventional suspension was shocked. Test conditions include the shock duration time of 1 msec and acceleration of 460 G. As shown in FIG. 15, the mean value for dimple separation for the time interval from 0 to 5.5 msec is as large as 0.21 mm. FIG. 16 shows the result of measurement of the change of the angle of inclination of the head in the pitching direction obtained when the conventional suspension was shocked. According to this test result, the range of inclination angle change of the head is as wide as 36.78°, and the head inclination reciprocates with relatively wide amplitudes in both the positive (+) and negative (−) directions.

Possibly, the occurrence of dimple separation and head inclination may be restrained by enhancing the stiffness of the flexure. If the stiffness of the flexure is increased, however, it is difficult to change the attitude of the slider flexibly when the slider floats low above the disc. Thus, stiffness of the flexure cannot be enhanced without a problem.

BRIEF SUMMARY OF THE INVENTION

Accordingly, the object of the present invention is to provide a suspension for a disc drive that is capable of restraining excessive inclination of a head or occurrence of dimple separation when it is shocked, without enhancing the stiffness of a flexure, so that good shock resistance is enjoyed.

In order to achieve the above object, a suspension according to the present invention comprises: a load beam having a proximal portion and a distal end portion; a flexure attached to the load beam and including a moving part movable in the thickness direction thereof with respect to the distal end portion of the load beam, the moving part carrying a head thereon; and a limiter member attached. to the flexure and used to restrain the angle of inclination of the moving part. In the suspension according to the invention constructed in this manner, the moving part of the flexure can be restrained from excessively inclining by means of the limiter member when it is shocked. Accordingly, the head can be prevented from substantially changing its attitude and dimple separation can be restrained without enhancing the stiffness of the flexure.

According to the invention, the flexure may include a pair of outrigger portions, arranged individually on the opposite side portions thereof, left and right, and flexible in the thickness direction of the flexure, and a tongue portion, situated between the outrigger portions, having a front end portion continuous with the outrigger portions, and flexible in the thickness direction, the tongue portion carrying a head thereon. In this case, the tongue portion corresponds to the moving part of the flexure. In the suspension constructed in this manner, the outrigger portions and the tongue portion bend in the thickness direction. As the displacement of the tongue portion or the outrigger portions is restricted by the limiter member, excessive change of angle of the head or occurrence of dimple separation can be restrained.

In an aspect of the invention, the limiter member includes arms, detachedly facing the outrigger portions in the thickness direction thereof, and a front edge portion detachedly facing the rear end portion of the tongue portion in the thickness direction thereof. The limiter member constructed in this manner has a simple shape and configuration and is easy to manufacture. According to this arrangement, moreover, the limiter member can be easily combined with the flexure (e.g., by laser welding, adhesive bonding, etc.). When the head is inclined in the positive direction of the pitching angle, in the suspension provided with this limiter member, the rear end portion of the tongue portion engages the front edge portion of the limiter member, thereby restraining the head from further inclining. When the head is inclined in the negative direction of the pitching angle, the outrigger portions engage their corresponding arms, thereby restraining the head from further inclining.

In another aspect of the invention, the limiter member includes a first projection, detachedly facing one surface of the rear end portion of the tongue portion in the thickness direction thereof, and a second projection detachedly facing the other surface of the rear end portion of the tongue portion in the thickness direction thereof. This limiter member can be reduced in size and weight. When the head is inclined in the positive direction of the pitching angle, in the suspension provided with this limiter member, the rear end portion of the tongue portion engages the first projection of the limiter member, thereby restraining the head from further inclining. When the head is inclined in the negative direction of the pitching angle, the rear end portion of the tongue portion engages the second projection of the limiter member, thereby restraining the head from further inclining.

In still another aspect of the invention, the limiter member includes arms detachedly facing the outrigger portions in the thickness direction thereof, a first projection detachedly facing one surface of the rear end portion of the tongue portion in the thickness direction thereof, and a second projection detachedly facing the other surface of the rear end portion of the tongue portion in the thickness direction thereof. This limiter member can more securely restrain the head from excessively inclining when it is shocked. Thus, when the head is inclined in the positive direction of the pitching angle, in the suspension provided with this limiter member, the rear end portion of the tongue portion engages the first projection of the limiter member, thereby restraining the head from further inclining. When the head is inclined in the negative direction of the pitching angle, the rear end portion of the tongue portion engages the second projection of the limiter member, or the outrigger portions engage their corresponding arms, thereby securely restraining the head from further inclining.

The suspension according to the present invention may comprise a support projection (also called a dimple in the art) formed between the load beam and the moving part of the flexure and supporting the moving part of the flexure for inclining motion. Also in the suspension provided with this support projection, the limiter member can effectively serve to restrain the head from excessively inclining when it is shocked.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to the accompanying drawings of FIGS. 1 to 6.

Figure 3:
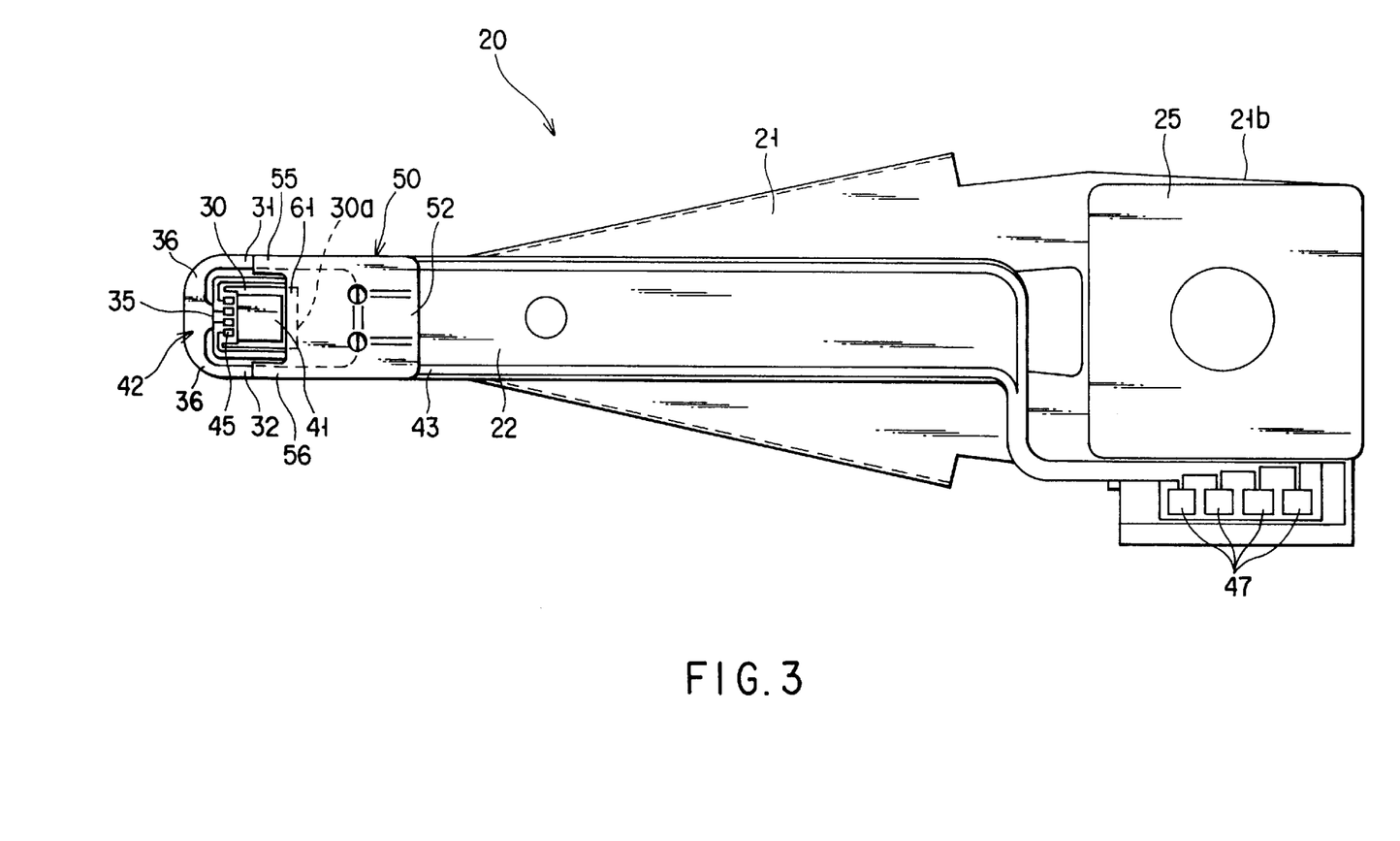
FIG. 3 is a general plan view of the suspension shown in FIG. 1.

Referring to FIG. 3, there is shown an example of a suspension 20 for hard disc drive (HDD). The suspension 20 comprises a load beam 21, formed of a thin precision plate spring of stainless steel or the like, and a flexure 22, formed of a very thin plate spring fixed to the load beam 21 by laser welding or the like. The flexure 22 is a springy sheet of stainless steel with a thickness of 18 $\mu$m to 30 $\mu$m, for example.

A base plate 25 is provided on a proximal portion 21b of the load beam 21 so that the beam 21 is fixed to a carriage (e.g., carriage 2 shown in FIG. 11) by means of the plate 25.

The flexure 22 extends in the axial direction (longitudinal direction) of the load beam 21. Formed on the distal end portion of the flexure 22 are a tongue portion 30 that functions as a moving part and a pair of outrigger portions 31 and 32, left and right, extending in the longitudinal direction of the flexure 22. The tongue portion 30 and the outrigger portions 31 and 32 are flexible in the thickness direction of the flexure 22.

Figure 4:
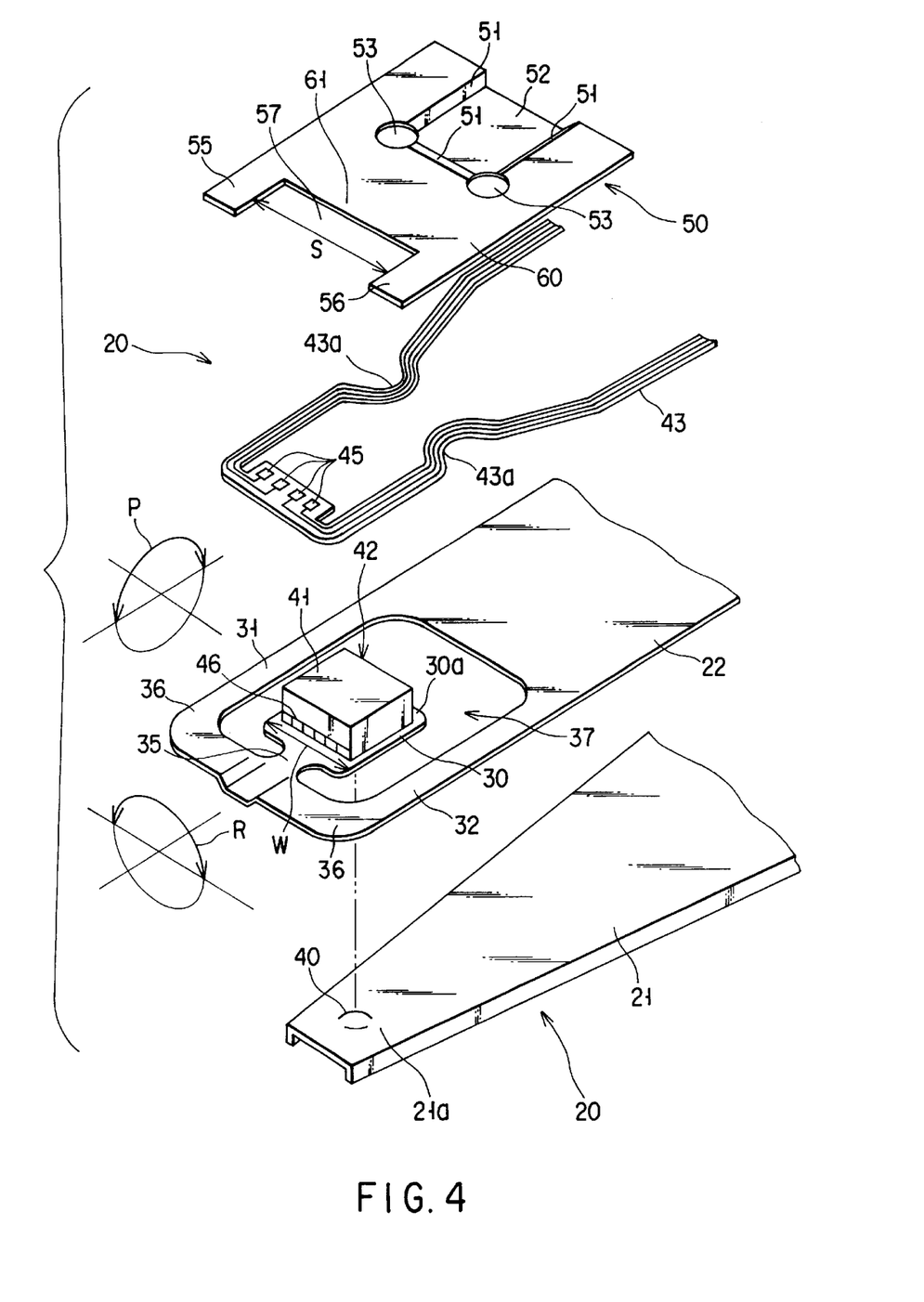
FIG. 4 is an exploded perspective view showing a part of the suspension of FIG. 1.

As shown in FIG. 4, a front end of the tongue portion 30 is connected to the respective front ends of the outrigger portions 31 and 32 by means of connecting portions 36 that extend in the width direction of the flexure 22. A U-shaped gap 37 is formed around the tongue portion 30 by etching or the like.

Figure 2:
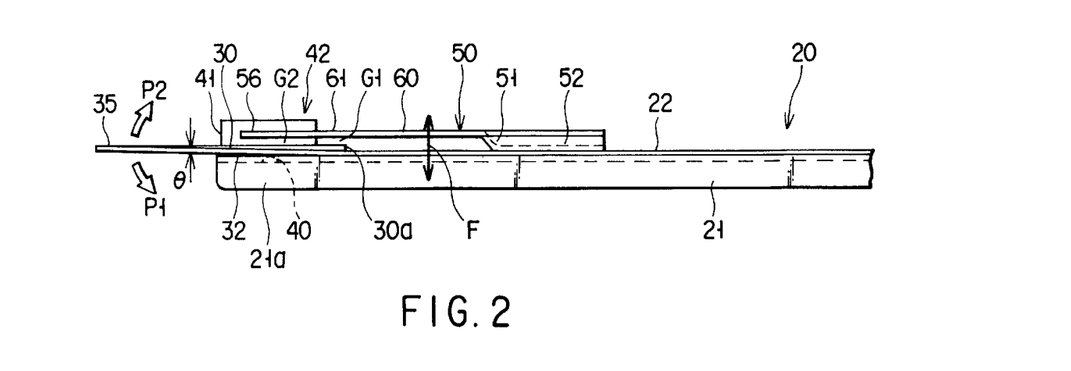
FIG. 2 is a side view of the suspension shown in FIG. 1.

As shown in FIG. 2, the tongue portion 30 is bent so that it is inclined at a pitching angle θ of less than 2° or 3°, for example. The tongue portion 30 and the outrigger portions 31 and 32 can individually bend in a positive direction (indicated by arrow P1) and a negative direction (indicated by arrow P2) of the pitching angle. The back surface of the tongue portion 30 is in contact with a support projection 40 at a distal end portion 21a of the load beam 21. The support projection 40 is a hemispherical projection that projects toward the tongue portion 30. The distal end of the projection 40 presses the flexure 22. The projection 40, which is depressed inside, is also called a dimple.

A slider 41 is fixed to the tongue portion 30 by adhesive bonding or the like. The slider 41 is provided with a transducer (not shown) for use as a magnetoelectric converter. When a hard disc as a storage medium rotates at high speed, the slider 41 floats low above the surface of the disc, whereupon an air bearing is formed between the disc and the slider 41. The slider 41, transducer, etc. constitutes a head 42.

Since the distal end of the support projection 40 presses the tongue portion 30 of the flexure 22, the tongue portion 30, carrying the slider 41 thereon, can make three-dimensional displacements including pitching (in the direction of arrow P in FIG. 4) and rolling (in the direction of arrow R in FIG. 4) around the support projection 40. The projection 40 may be provided on the flexure 22 instead of being formed on the load beam 21.

The flexure 22 is provided with a wiring portion 43. First terminal portions 45 are arranged on one end of the wiring portion 43. They are connected electrically to a terminal 46 of the slider 41. As shown in FIG. 3, the other end of the wiring portion 43 extends in the longitudinal direction of the flexure 22, and second terminal portions 47 are arranged near the base plate 25. The second terminal portions 47 are connected to external lead wires (not shown). In this embodiment, the wiring portion 43 is provided with bent portions 43a so that it is easily bendable. In some cases, however, the wiring portion 43 may be made straight without being provided with the bent portions 43a.

The flexure 22 is provided with a limiter member 50 for restraining the angle of inclination of the tongue portion 30. The limiter member 50 is formed of a very thin metal sheet that is substantially as thick as the flexure 22, and a mounting portion 52 is provided on its proximal portion. The mounting portion 52 has stepped portions 51 that are formed by pressing so that the mounting portion 52 projects toward the flexure 22. Holes 53 are bored in suitable regions of the limiter member 50 near the mounting portion 52, whereby press forming of the mounting portion 52 is facilitated.

A pair of arms 55 and 56, left and right, protrude from the distal end portion of the limiter member 50 so as to extend forward along the outrigger portions 31 and 32, respectively. A recess 57 is formed between the arms 55 and 56, whereby the member 50 can avoid interfering with the slider 41. A distance S (shown in FIG. 4) between the arms 55 and 56 is greater than a width W of the tongue portion 30. The contour, holes 53, etc. of the limiter member 50 are properly shaped by etching or the like.

Figure 1:
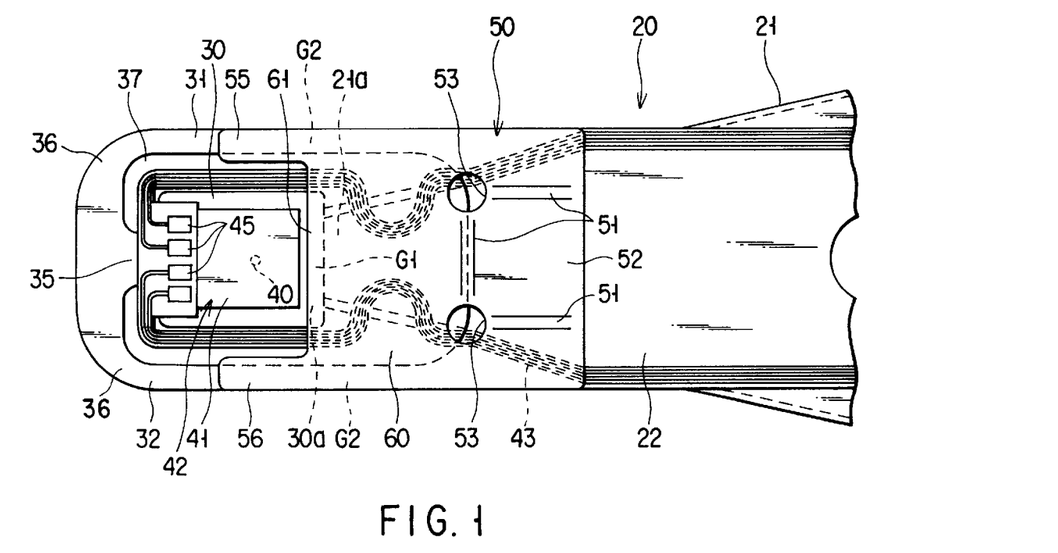
FIG. 1 is a plan view showing a part of a suspension for disc drive according to a first embodiment of the present invention.

The mounting portion 52 is fixed to the flexure 22 by using suitable fixing means such as laser welding. When the mounting portion 52 is fixed to the flexure 22, as shown in FIGS. 1, 2, etc., the limiter member 50 separate from the flexure 22 so that its region 60 outside the mounting portion 52 detachedly faces the flexure 22 in its thickness direction (indicated by arrow F in FIG. 2).

A front edge portion 61 of the limiter member 50 between the arms 55 and 56 faces a rear end portion 30a of the tongue portion 30 in the thickness direction. A gap G1 is secured between the front edge portion 61 of the limiter member 50 and the rear end portion 30a of the tongue portion 30 so that the tongue portion can be displaced to some extent in the thickness direction.

The arms 55 and 56 of the limiter member 50 detachedly face the respective longitudinal intermediate portions of their corresponding outrigger portions 31 and 32 in the thickness direction. Gaps G2 are secured between the arms 55 and 56 and the outrigger portions 31 and 32 so that the outrigger portions 31 and 32 can be displaced to some extent in the thickness direction. These gaps G1 and G2 allow the slider 41 to be flexibly displaced when the slider 41 floats low above the hard disc.

The following is a description of the operation of the suspension 20 according to the first embodiment.

If the suspension 20 is shocked, the rear end portion 30a of the tongue portion 30 moves upward (FIG. 2) as the head 42 moves in the positive direction (indicated by arrow P1 in FIG. 2) of the pitching angle of the head 42. The head 42 is restrained from further inclining by engaging the front edge portion 61 of the limiter member 50. As the head 42 moves in the negative direction (indicated by arrow P2 in FIG. 2) of the pitching angle, in contrast with this, the outrigger portions 31 and 32 move upward (FIG. 2) and engage the arms 55 and 56, respectively, thereby restraining the head 42 from further inclining.

Figure 5:
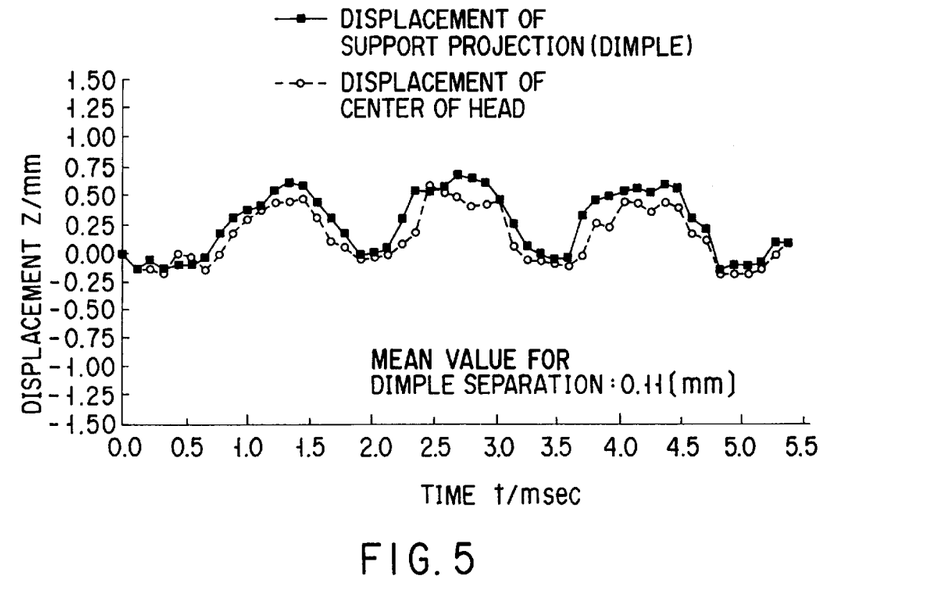
FIG. 5 is a diagram showing displacements of a head and the like in a shock test on the suspension of FIG. 1.

FIG. 5 shows the result of a shock test in which the respective displacements of the head and the support projection were measured when the suspension according to the first embodiment was shocked. Test conditions include the shock duration time of 1 msec and acceleration of 460 G. In the suspension 20 according to this embodiment, as shown in FIG. 5, the respective displacements and moving speeds of the head and the support projection are minor or low, and the mean value for dimple separation for the time interval from 0 to 5.5 msec is as small as 0.11 mm.

In the conventional suspension 20 without a limiter member, on the other hand, the mean value for dimple separation is as large as 0.21 mm. Thus, the dimple separation of the suspension 20 according to this embodiment, compared with that of the conventional one, is improved by 47.6%.

Figure 6:
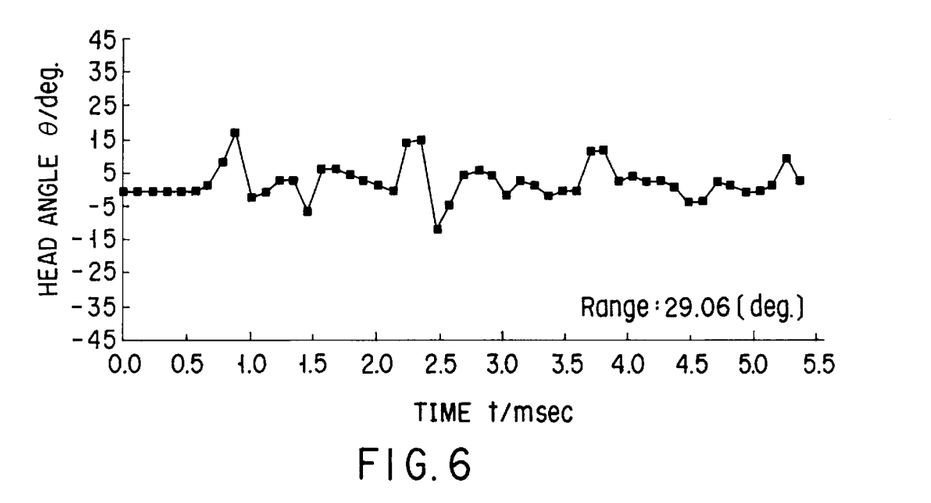
FIG. 6 is a diagram showing the change of the angle of inclination of the head in the shock test on the suspension of FIG. 1.

FIG. 6 shows the result of measurement of the change of the angle of inclination of the head in the pitching direction obtained when the suspension 20 according to the first embodiment was shocked. Test conditions include the shock duration time of 1 msec and acceleration of 460 G. According to this embodiment, the range of angle change of the head is 29.06°, and the frequency of transition of the head inclination. in the negative (−) direction can be lowered.

In the case of the conventional suspension without a limiter member, on the other hand, the range of angle change is as wide as 36.78°, and the head inclination reciprocates in both the positive (+) and negative (−) directions. Thus, the head inclination of the suspension 20 according to this embodiment, compared with that of the conventional one, is improved by 18.0%.

Displacements in the rolling direction are restrained as the outrigger portions 31 and 32 are controlled by their corresponding arms 55 and 56 of the limiter member 50.

Having a simple shape, the limiter member 50 according to the first embodiment can be easily formed by etching or pressing. Since it can be fixed to the flexure 22 by only being put on the top surface of the flexure 22 from above and laser-welded thereto, moreover, the limiter member 50 can be easily attached to the flexure 22.

Figure 7:
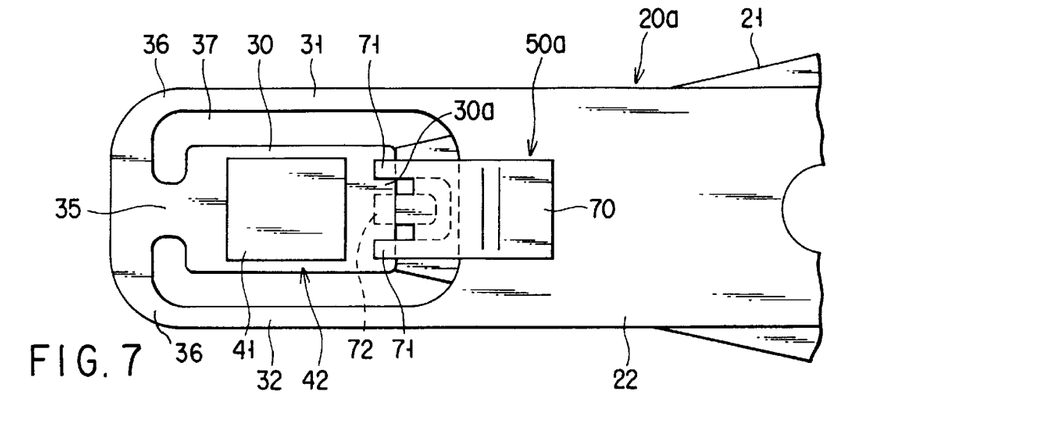
FIG. 7 is a plan view showing a part of a suspension for disc drive according to a second embodiment of the invention.
Figure 8:
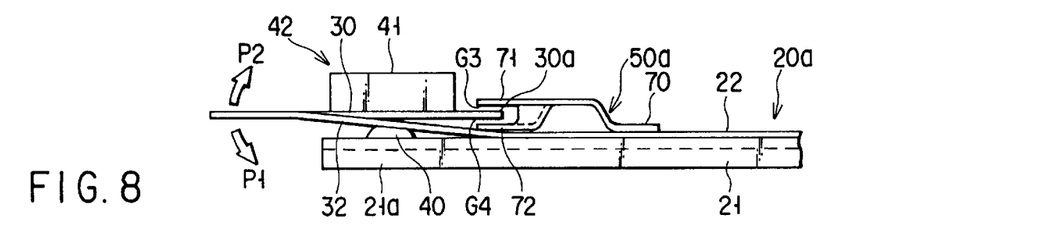
FIG. 8 is a side view of the suspension shown in FIG. 7.

FIGS. 7 and 8 show a suspension 20a according to a second embodiment of the present invention. A limiter member 50a of the suspension 20a is different from the limiter member 50 according to the first embodiment in construction. Since other members are common to the suspensions 20 and 20a of these two embodiments, like reference numerals are used to designate the common members, and a detailed description of those members is omitted.

The limiter member 50a of the suspension 20a according to the second embodiment includes a mounting portion 70 fixed to a flexure 22 by laser-welding or the like, first projections 71 detachedly facing the top surface (one surface) of a rear end portion 30a of a tongue portion 30, and a second projection 72 detachedly facing the undersurface (other surface) of the rear end portion 30a of the tongue portion 30.

As shown in FIG. 8, gaps G3 are secured between the first projections 71 of the limiter member 50a and the rear end portion 30a of the tongue portion 30 so that the rear end portion 30a of the tongue portion can be displaced to some extent in the thickness direction. Likewise, a gap G4 is secured between the second projection 72 of the limiter member 50a and the rear end portion 30a of the tongue portion 30 so that the rear end portion 30a of the tongue portion can be displaced to some extent in the thickness direction. These gaps G3 and G4 allow a slider 41 to be flexibly displaced when the slider 41 floats low above a hard disc. A wiring portion is not shown.

If the suspension 20a having this limiter member 50a is shocked, the rear end portion 30a of the tongue portion 30 moves upward (FIG. 8) as a head 42 moves in the positive direction (indicated by arrow P1 in FIG. 8) of the pitching angle of the head 42. The head 42 is restrained from further inclining by engaging the first projections 71 of the limiter member 50a. As the head 42 moves in the negative direction (indicated by arrow P2 in FIG. 8) of the pitching angle, in contrast with this, the rear end portion 30a of the tongue portion 30 moves downward (FIG. 8) and engages the second projection 72 of the limiter member 50a, thereby restraining the head 42 from further inclining.

The limiter member 50a according to the second embodiment, enjoying the construction and function described above, has an advantage over the limiter member 50 according to the first embodiment in being smaller enough in size and lighter in weight.

Figure 9:
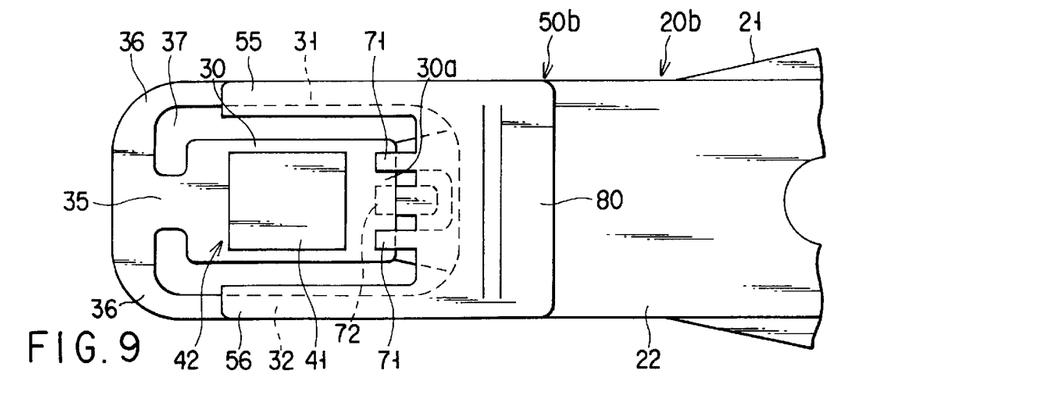
FIG. 9 is a plan view showing a part of a suspension for disc drive according to a third embodiment of the invention.
Figure 10:
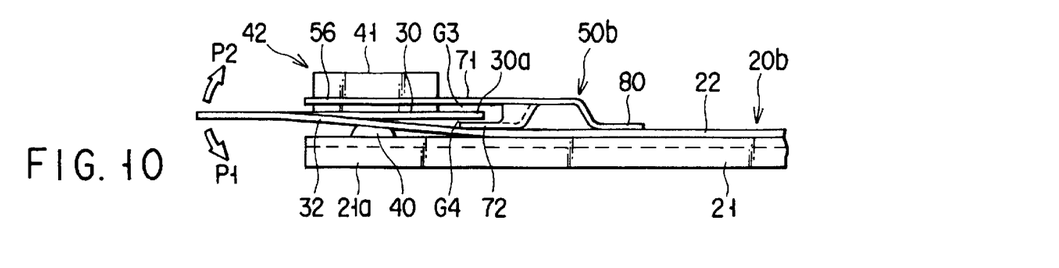
FIG. 10 is a side view of the suspension shown in FIG. 9.

FIGS. 9 and 10 show a suspension 20b according to a third embodiment of the present invention. A limiter member 50b of the suspension 20b is also different from the limiter member 50 according to the first embodiment in construction. Since other members are common to the suspensions 20 and 20b of these two embodiments, like reference numerals are used to designate the common members, and a detailed description of those members is omitted.

The limiter member 50b of the suspension 20b according to the third embodiment includes a mounting portion 80 fixed to a flexure 22 by laser-welding or the like, a pair of arms 55 and 56, left and right, which resembles the ones according to the first embodiment, and first and second projections 71 and 72, which resembles the ones according to the second embodiment. A wiring portion is not shown.

If the suspension 20b having this limiter member 50b is shocked, a rear end portion 30a of a tongue portion 30 moves upward (FIG. 10) as a head 42 moves in the positive direction (indicated by arrow P1 in FIG. 10) of the pitching angle of the head 42. The head 42 is restrained from further inclining by engaging the first projections 71 of the limiter member 50b. As the head 42 moves in the negative direction (indicated by arrow P2 in FIG. 10) of the pitching angle, the rear end portion 30a of the tongue portion 30 moves downward (FIG. 10) and engages the second projection 72 of the limiter member 50b, or the outrigger portions 31 and 32 move upward (FIG. 10) and engage their corresponding arms 55 and 56 of the limiter member 50b. Thus, the head 42 is securely restrained from further inclining.

It is to be understood that the present invention is not limited to the embodiments described above, and that the respective shapes of the components of the invention, including the load beam, flexure, head, support projection, moving part (tongue portion), limiter member, etc., may be suitably changed without departing from the scope or spirit of the invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disk drive, comprising:
   a load beam having a proximal portion and a distal end portion;
   a flexure that is attached to the load beam and that includes a tongue portion as a moving part movable in a thickness direction of the flexure with respect to the distal end portion of the load beam, said flexure further including a pair of outrigger portions that are arranged individually on opposite left and right sides of the tongue portion, wherein the tongue portion and the outrigger portions are flexible in the thickness direction of the flexure and the tongue portion has a front end portion that is continuous with the outrigger portions, and wherein the tongue portion is adapted to carry a head;
   a support projection that projects between the load beam and the tongue portion of the flexure and that supports the tongue portion of the flexure for inclining motion; and
   a limiter member that is attached to the flexure and that is used to restrain an angle of inclination of the tongue portion of the flexure, said limiter member including a pair of arms that respectively extend along the outrigger portions and that are respectively spaced from the outrigger portions in the thickness direction of the flexure, and said limiter member further including a front edge portion that faces a rear end portion of the tongue portion and that is spaced from the rear end portion of the tongue portion in the thickness direction of the flexure, wherein said arms respectively oppose the outrigger portions along the entire length of the respective arms, and said arms are parallel to the outrigger portions, and wherein the length of the limiter member including the arms is more than one half of a length of one of the outrigger portions.

2. A suspension for a disk drive, comprising:

a load beam having a proximal portion and a distal end portion;

a flexure that is attached to the load beam and that includes a tongue portion as a moving part movable in a thickness direction of the flexure with respect to the distal end portion of the load beam, said flexure further including a pair of outrigger portions that are arranged individually on opposite left and right sides of the tongue portion, wherein the tongue portion and the outrigger portions are flexible in the thickness direction of the flexure and the tongue portion has a front end portion that is continuous with the outrigger portions, and wherein the tongue portion is adapted to carry a head;

a support projection that projects between the load beam and the tongue portion of the flexure and that supports the tongue portion of the flexure for inclining motion; and a limiter member that is attached to the flexure and that is used to restrain an angle of inclination of the tongue portion of the flexure, said limiter member including a pair of arms that respectively extend along the outrigger portions and that are respectively spaced from the outrigger portions in the thickness direction of the flexure, and said limiter member further including a first projection that faces a first surface of a rear end portion of the tongue portion in the thickness direction of the flexure and a second projection that faces a second surface of the rear end portion of the tongue portion in the thickness direction of the flexure, wherein said arms respectively oppose the outrigger portions along the entire length of the respective arms, and said arms are parallel to the outrigger portions, and wherein the length of the limiter member including the arms is more than one half of a length of one of the outrigger portions.

* * * * *